United States Patent [19]

Rogers et al.

[11] Patent Number: 4,657,455

[45] Date of Patent: Apr. 14, 1987

[54] CONCRETE MACHINE TOOLS

[75] Inventors: Albert J. Rogers, Arlington; Michael E. Smith, Springfield, both of Va.; James E. Trounson, Washington, D.C.

[73] Assignee: Cemtronics, Washington, D.C.

[21] Appl. No.: 882,527

[22] Filed: Jul. 7, 1986

Related U.S. Application Data

[60] Division of Ser. No. 672,200, Nov. 16, 1984, Pat. No. 4,622,194, which is a continuation-in-part of Ser. No. 503,550, Jun. 13, 1983, abandoned.

[51] Int. Cl.$^4$ .............................................. B23B 17/00
[52] U.S. Cl. ........................................ 409/235; 82/32; 82/30; 384/907; 384/907.1; 384/913; 384/12; 408/234
[58] Field of Search ............... 82/32, 30; 384/12, 907, 384/907.1, 913; 408/234; 409/235

[56] References Cited

U.S. PATENT DOCUMENTS

| | | | |
|---|---|---|---|
| 2,010,557 | 8/1935 | Nenninger et al. | 82/32 |
| 2,487,289 | 11/1949 | Yeomans et al. | 409/162 |
| 2,535,100 | 12/1950 | Sourwine | 264/135 |
| 2,971,295 | 2/1961 | Reynolds | 248/679 |
| 3,053,580 | 9/1962 | Bullard, III et al. | 308/3 A |
| 3,231,460 | 1/1966 | Andrews | 428/422 |
| 3,334,850 | 8/1967 | Jackson et al. | 248/679 |
| 3,586,395 | 6/1971 | Weaver | 82/32 |
| 3,618,432 | 11/1971 | Briese | 82/32 |
| 3,685,940 | 8/1972 | Bradshaw et al. | 264/333 |
| 3,800,636 | 4/1974 | Zagar | 82/32 |
| 3,956,563 | 5/1976 | Spang et al. | 428/327 |
| 4,040,316 | 8/1977 | Gramespacker et al. | 82/32 |
| 4,093,906 | 6/1978 | Murray | 264/82 |
| 4,134,562 | 1/1979 | Paakkinen et al. | 248/679 |
| 4,241,126 | 12/1980 | Nicolas et al. | 428/174 |
| 4,323,529 | 4/1982 | Roberts et al. | 264/69 |
| 4,406,439 | 9/1983 | Garter | 249/64 |

FOREIGN PATENT DOCUMENTS

| | | | |
|---|---|---|---|
| 93800 | 11/1983 | European Pat. Off. | 82/32 |
| 148933 | 6/1981 | Fed. Rep. of Germany | 82/32 |
| 96745 | 6/1982 | Japan | 82/32 |
| 9375 | of 1903 | United Kingdom | 384/907 |

OTHER PUBLICATIONS

Morrisey, Thomas, *Machinists Library: Machine Shop*, Howard W. Sams & Co., Indianapolis, Ind., 1978, pp. 109-121.

"Centerless Grinding Machines", Cincinnati Milacron Sales Brochure, Pub. No. G-1087, Cincinnati, Ohio 1984.

*Primary Examiner*—Z. R. Bilinsky
*Assistant Examiner*—Daniel W. Howell
*Attorney, Agent, or Firm*—Burns, Doane, Swecker & Mathis

[57] ABSTRACT

A process for constructing machine tools. The process includes constructing a form, pouring concrete into the form, allowing the concrete to set, and grinding the sliding surfaces to be properly aligned and precision surfaces. Also disclosed are machine tools made by the process, and a method of assembling such machine tools.

5 Claims, 7 Drawing Figures

CONCRETE MACHINE TOOLS

RELATED APPLICATION

This application is a division, of application Ser. No. 672,200, filed Nov. 16, 1984, now U.S. Pat. No. 4,622,194, which is a continuation-in-part of Ser. No. 503,550, filed June 13, 1983, now abandoned.

BACKGROUND OF THE INVENTION

The present invention relates to machine tools, and more particularly, the construction of machine tool frames.

The construction of machine tools and precision mechanical components (hereinafter referred to as machine tools) requires a material which can withstand high stress, be shaped with good accuracy, take a good finish when machined, carry load without significant deformation, and remain dimensionally stable over long periods of time. Materials which have these properties and are most commonly used for these applications are steel and cast iron.

Although these materials have the required properties for the construction of machine tools, they are all relatively expensive. Also, the process of casting iron, steel, or other metals into large precision mechanical forms is well known to be an expensive and difficult task. Because of the high temperatures and rapid differential cooling inherent in metal casting, significant internal stresses result. Much attention must be given to the balancing and relieving of these stresses to obtain dimensional accuracy during surface finishing operations and maintaining dimensional stability over the part's useful life.

In addition to care in manufacture, reliable operation from metal machine tools requires that they be securely mounted on and bolted to a rigid foundation which in almost every case is a thick concrete slab with anchor bolts cast into it to receive the leveling screws on the machine tool. This combination of leveling screws and jacking bolts is then used to "pull" the metal machine into level alignment. All but the smallest machine tools will be twisted and bent under their own weight and residual casting stresses relieved non-uniformly by machining of the ways until they are properly installed on the rigid foundation. It is safe to say that overall rigidity and resistance to forces generated by the tool's operation is primarily carried by the foundation. It is only local stresses which the metal frame handles and transmits to the foundation. The surface finish necessary to support lubrication between moving parts is also conveniently produced directly on a metal frame.

All prior applications of concrete to machine tool construction amount to attempts at changing the location of the mechanical interface between the local stress carrying metal members and the overall load carrying concrete foundation. In some instances concrete is used to fill otherwise hollow metal castings to increase stiffness and damp vibration. In the extreme, metal ways are attached to the concrete creating a "concrete frame".

The only material other than iron and steel in somewhat common usage for construction of machine tools is granite. However, the predominate use of granite in the machine tool industry is not for tool frames but rather as surface plates. Surface plates are nothing more than a very accurately flat surface used as an inspection stand or flat reference for precise measurement. The use of granite in machine tool construction is a conceptual extension of granite surface plates and is really an extreme measure, involving great difficulty and very high costs and is resorted to only as a last measure where only the well-known properties of granite can result in a rigid enough set-up to produce really the ultimate in cutting accuracy. The difficulties in using granite and the distinction from concrete are more apparent than between concrete and cast iron.

Of course, the biggest difference is that granite is not cast to shape, rather it is quarried. A single, flawless block of granite the size of the machine desired must be cut, then the desired shape cut from such a block. Even after the general shape is obtained, extreme measures are required to attach anything to the granite in order to create a usable tool.

The state of the art as discussed above is illustrated by the following patents.

Briese, U.S. Pat. No. 3,618,432, discloses construction of a vibration-free lathe. The lathe is preferably made from a single monolithic block of granite, although it is stated that other naturally occurring minerals or rock may be equally satisfactory as may also be selected synthetic materials.

Zagar, U.S. Pat. No. 3,800,636, discloses a compression reinforced concrete machine tool frame. The concrete is molded with the tensioning rods in place, which rods are tensioned after the concrete has set. The machine tool components can be mounted on or anchored within the concrete frame. Other machine tool components which are moveable slide on steel runners which are likewise mounted on the frame. Zagar also discloses that a release component (e.g. grease, soft wax, paraffin) may be coated onto the tensioning rods to prevent them from being anchored to the frame.

Yeomans et al, U.S. Pat. No. 2,487,289, discloses a machine tool which appears from FIG. 1 to have a cementitious base, although there is no discussion of specific materials.

Nenninger et al, U.S. Pat. No. 2,010,557, also discloses a machine tool having a concrete base for minimizing vibration and to prevent deflection of a machine tool bed.

Accordingly, a need existed in the art for a process for constructing machine tools from inexpensive and easily used materials, while still obtaining adequate surface finish to sustain lubrication.

SUMMARY OF THE INVENTION

The present invention is a process for constructing machine tools. The process includes constructing a form, pouring concrete into the form, allowing the concrete to set, and grinding the sliding surfaces to be properly aligned and precision surfaces. The invention also includes machine tools made by the process.

DESCRIPTION OF PREFERRED EMBODIMENTS

Figure 1:
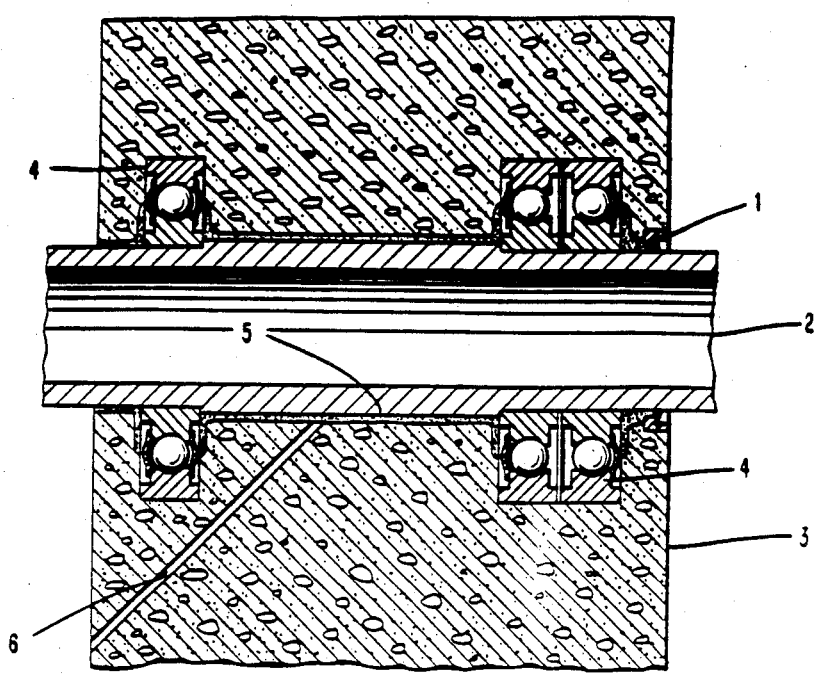
FIG. 1 is a cross-sectional view of a rotating shaft with ball bearings and shaft seal cast directly into a concrete housing.

The present invention concerns machine tools constructed of reinforced concrete and processes of constructing such machine tools. The concrete is used as the main supporting structure as well as for at least one of the precision sliding surfaces for the machine tool. The present invention must be contrasted with the prior art in which concrete was sometimes used as a base, but never as the precision sliding surface.

By "concrete" is meant the commonly used construction material consisting of conglomerate gravel, pebbles, broken stone, or slag in a mortar or cement matrix. While not preferred, small amounts of materials such as polymeric binders and other such additives known to these skilled in the art can also be incorporated. However, one of the advantages of the present invention is its relatively low cost which may be adversely affected by the addition of such materials.

Numerous advantages are obtained from using concrete for the precision sliding surfaces as well as the main supporting structure, as opposed to metals. Concrete has a very low cost per unit volume; it is easily formed at room temperature; it does not develop internal stress during the curing process; it can contain any hard aggregate suitable as a bearing surface; it will not corrode; it damps out vibration; and bearings, shaft seals, and other fixtures can be easily cast in place.

In particular, there are advantages in directly grinding concrete itself as compared to grinding metals. Concrete cures slowly at room temperature at a rather uniform rate through the mass, and as a result, little or no internal stress develops. This is contrasted with metals which are produced at high temperatures and solidify at different rates within the article leaving very large internal stresses after casting. When metal castings are ground, these stresses are relieved unevenly resulting in immediate deformation followed by a long period of slow stress relief, a period of months to a year or more. In contrast, with no internal stress, concrete can be ground leaving the underlying frame dimensionally unchanged.

Although concrete cannot be used to produce fine, highly stressed mechanical detail, the present application describes methods to interface concrete base material with small precision moving parts made of steel or other metallic materials. In addition, it has recently become possible to replace many complicated mechanical components with simpler microprocessor control. The structural properties of concrete combined with the mechanical simplification of microprocessor control make possible great overall economies of machine tool construction.

The above discussion is directed to untreated concrete surfaces. However, it is also within the scope of the present invention to treat the precision concrete surface with a subsequent surface finish. In such case, the concrete acts as the load bearing surface with the added finish being to enhance lubrication, durability or hardness. Suitable surface finishes are well known in the art and include metalizing, electroplating, chemical etching, polymer coating (e.g. Teflon, a trademark of E.I. DuPont de Nemours for tetrafluoroethylene fluorocarbon polymers), and sealing with wax.

In a preferred embodiment of the present invention, additional aggregate is added to the load bearing surfaces before the concrete is allowed to set. Since the aggregate comprises the primary load bearing element, it is preferred to have as much aggregate as possible at the surface after precision grinding is complete. It is generally preferred to cast the concrete with the bearing surface at the bottom to encourage migration of the aggregate to the surface to be ground. Vibration of the concrete before setting is preferred because it assists in settling the aggregate and tends to orient the aggregate particles with their flattest side against the form. This tends to reduce the amount of subsequent grinding required. Suitable aggregate materials include, but are not limited to, quartz, marble and granite. As is known in the art, two bearing surfaces made of the same material will seldom provide satisfactory performance when used against each, the primary problem being galling of the surfaces. Depending on the application, superior performance can be expected when the two surfaces employ different wearing/bearing materials. For example, quartz used as the additional aggregate for one surface, and marble used as the additional aggregate for the other, can be expected to provide better performance then quartz against quartz, even though quartz is a much harder material.

As concrete is a brittle material, some chipping of precision edges can occur during assembly if precautions are not taken. Such chipping is very undesirable since debris from chipping is very abrasive, and if not removed, will adversely affect performance. A thin piece of resilient material is preferably placed on one of the surfaces before the surfaces are mated and removed only as the last step in the mating process. Thin tapes of resilient material are frequently used as permanent way surfaces, both on new machines and as a method of rebuilding ways of worn out machines. Generally such tapes are applied to only one surface. Such tapes are particularly useful in connection with concrete ways because in addition to providing a surface of low friction and a different material, they provide the resiliency necessary to prevent chipping. One such commercially available tape is a filled polytetrafluoroethylene material available from Garlock Bearings Inc. of Thorofare, N.J. under the trademark MULTIFIL 426 bearing tape. Typical thickness is between about 0.015 and 0.125 inch. The tape is typically adhered to the surface by an adhesive, such as a two-part epoxy adhesive.

Although reference has been made to grinding in the above discussion, any known method of removing material can be used provided that a surface is obtained which is precision smooth and is sufficiently true to allow maintenance of hydrodynamic or gas dynamic lubrication, greasy film, dry coated lubrication, or other low-friction precision sliding motion between the respective parts. Methods of removing material include machining, grinding, and lapping. Concrete is readily ground to precision tolerances using commercially available silicon carbide or diamond grinding wheels. Typically, between about 0.010 and 0.100 inch of concrete is removed during the grinding process.

While not typically necessary, it is also possible to reinforce the concrete with steel bars or tensioning rods. The only place where reinforcing steel bars are particularly useful is in the headstock to prevent the spindle from leaving the headstock if the concrete fails due to forces set up in the spindle by a poorly balanced workpiece.

Most of the above discussion concerns straight line machine ways, but it is also possible to use the process of the present invention to prepare other items such as rotary journal bearings, rotary thrust bearings, cams, pathways which are curved or other desired shapes, and flat or hemispherical bearings with two degrees of freedom.

The present invention can also be used to provide previously machined precision components with structural support and as a means of maintaining the geometric relationship of components. Examples of such uses include casting anti-friction or journal bearings or bearing races into the concrete, either mounted to a shaft or individually; casting a shaft seal or labyrinth ring into the base material, either individually or while mounted to the shaft; casting a squeegee into the base material to exclude foreign material from sliding ways; and casting lines for lubrication and drainage lines into components to facilitate introduction of lubricant between mating components or to remove unwanted materials.

Another aspect of the present invention is a process for casting bearings which are pre-mounted on a shaft, or other mechanical arrangements, so as to enable the necessary clearance in the cast structure after casting is complete. In this process, the part is coated with a removable material to the clearance thickness desired between the part and the cast article. The coating can be any suitable material, a preferred material being paraffin wax, which will melt, dissolve or evaporate when subjected to heat or solvent.

As a part of the casting process, a pathway to the outside wall of the casting form, such as a drainage or suction pathway, is provided to allow the coating material to exit during the removal process. After the concrete has set, the coating material is melted, evaporated or dissolved and escapes through the pathway to provide the desired clearance.

As discussed briefly above, the figures illustrate various configurations of bearing surfaces and concrete supporting structures which can be made by the process of the present invention.

FIG. 1 shows the cross-section of a rotating shaft with ball bearings 4 and shaft seal 1 cast directly into a concrete housing 3. Clearance is maintained during casting by a wax coating 5 which is drained through drain tube 6 after the housing is cured in place. Most any type of antifriction or plain journal bearing would be suitable for this use. A shaft seal or labyrinth ring may or may not be required depending on the application and the sealing arrangement of the bearings themselves.

Figure 1A:
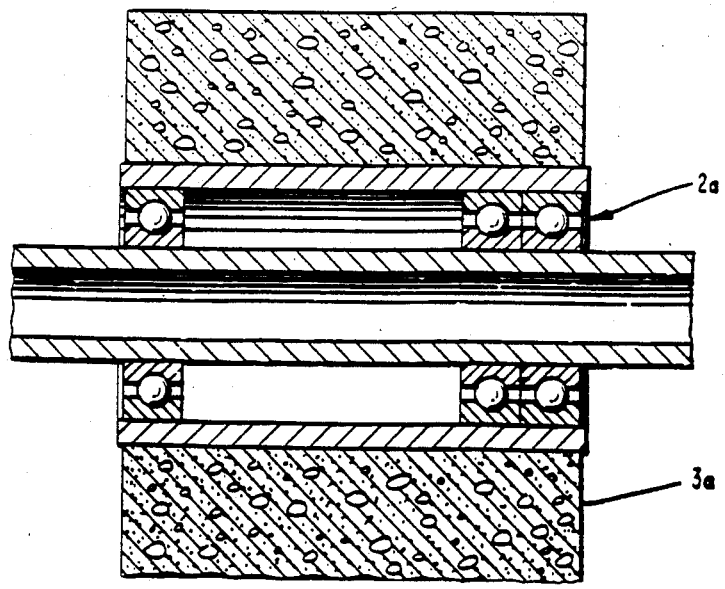
FIG. 1A is a cross-sectional view of an alternate method of placing bearings in a concrete base.

FIG. 1A shows an alternative method for placing bearings in a concrete base. The figure shows a complete rotating assembly (housing, bearings, seals, and shaft) cast as a unit 2a into a concrete supporting structure 3a. This arrangement offers advantages of being capable of disassembly, and clearance for shaft rotation is inherently maintained. However, the method is not preferred because it is more expensive and prevents automatic centering of bearings relative to the shaft which occurs when bearings are cast directly into concrete. A complete rotating or other type of assembly designed so as to be bolted or otherwise attached to a concrete supporting structure rather than being cast in place employed in conjunction with machining of the ways in alignment is also within the scope of this invention.

Figure 2:
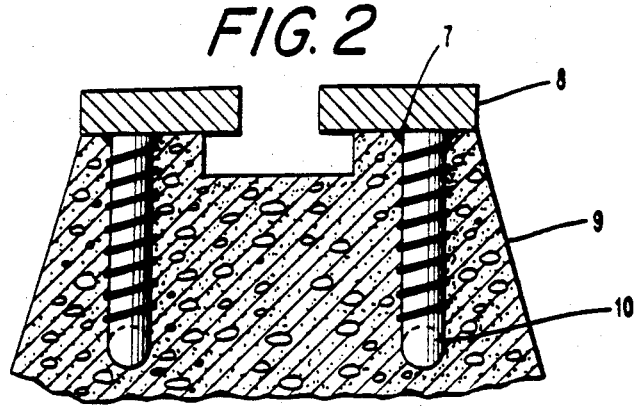
FIG. 2 is a cross-sectional view of a "T" slot arrangement for bolting a tool post to a lathe or a work piece to a milling machine table.

FIG. 2 shows a typical "T" slot arrangement for bolting a tool-post to a lathe or work-piece to a milling machine table. Metal bolting strips 8 are fastened to rebar anchor 10 by welding 7 and cast into concrete carrier 9.

Figure 3:
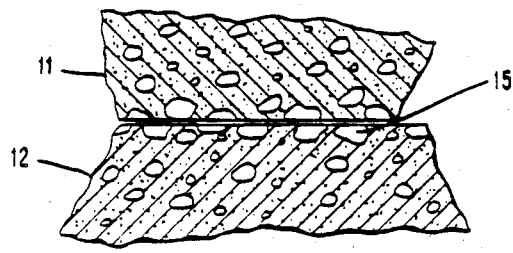
FIG. 3 is a cross-sectional view of a ground concrete on ground concrete plain bearing surface.

FIG. 3 shows a typical ground concrete 11 on ground concrete 12 plain bearing surface. The exposed aggregate 15 forms the primary bearing elements.

Figure 4:
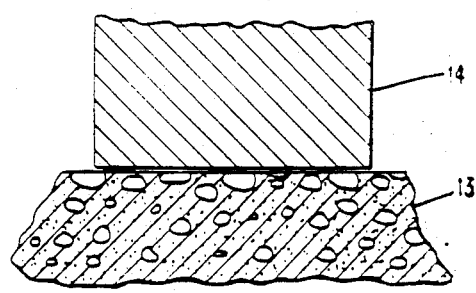
FIG. 4 is a cross-sectional view of a metal bearing surface on ground concrete.

FIG. 4 is similar to FIG. 3, except that it shows a metal or other material bearing surface 14 on ground concrete 13.

Figure 5:
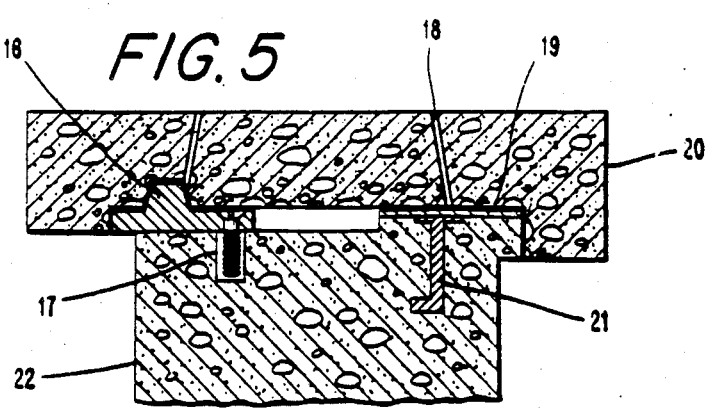
FIG. 5 is a cross-sectional view of a metal "V" way supported structurally by a concrete bed and fastened by bolting to a threaded cast-in-place anchor, with the other surface being ground concrete.

FIG. 5 shows a metal "V" way 16 supported structurally by a concrete bed 22 and fastened by bolting to a threaded cast-in-place anchor 17. The other flat continuous bearing surface of material such as metal, glass, or ceramic 19 is glued or welded to anchor 21 before casting onto concrete bed 22. Such continuous bearing surfaces can also be fastened directly to the concrete bed with adhesives. Any such bearing surfaces can easily be designed as permanent or replaceable elements depending on the application. Sliding member 20 is shown with a mating ground concrete bearing surface. Allowance is made for introduction of lubricant through lubrication line 18.

Figure 6:
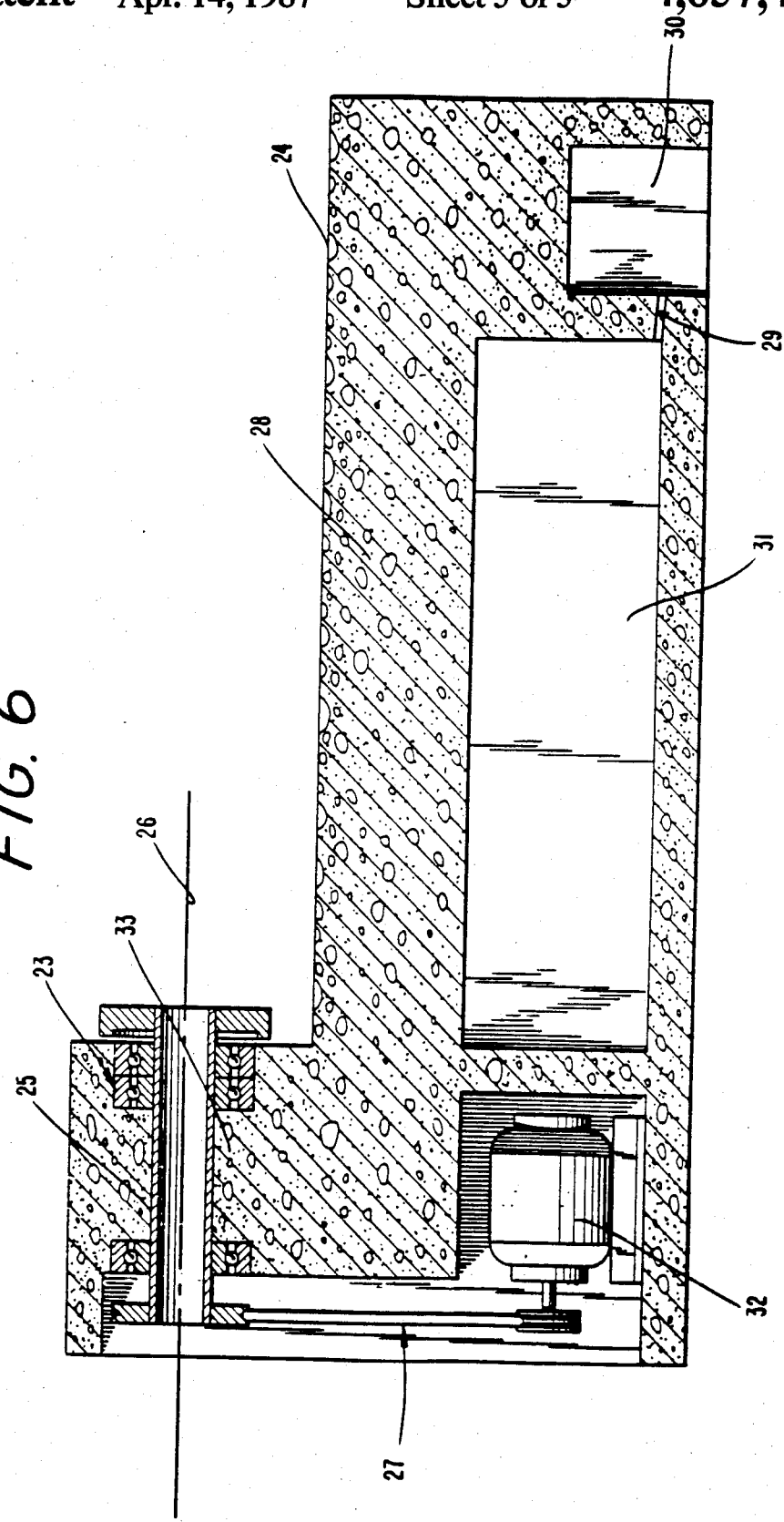
FIG. 6 is a cross-sectional view through a typical concrete lathe frame.

FIG. 6 is a cross section through a typical lathe frame produced by the method of the present invention. Rotating assembly 23 is cast in place as illustrated in FIG. 1, and then concrete surface 24 is precision ground to be aligned with axis of spindle rotation 26. Also illustrated are belt/pulley drive assembly 27, lathe bed 28, coolant drain 29, coolant trough 31, coolant reservoir 30, drive motor 32, and headstock 33.

While the invention has been described in terms of various preferred embodiments, one skilled in the art will appreciate that various modifications, substitutions, omissions, and changes may be made without departing from the spirit thereof. Accordingly, it is intended that the scope of the present invention be limited solely by the scope of the following claims.

What is claimed is:

1. A machine tool comprising means for holding a workpiece and means for holding a cutting tool, a machine way of at least one of said means for holding comprising a ground concrete surface, and a mated sliding surface of the other means for holding being in direct contact with the ground concrete surface.

2. The machine tool of claim 1 wherein the mated sliding surface of the other means for holding includes a surface finish in direct contact with the ground concrete surface.

3. The machine tool of claim 2 wherein at the ground concrete surface is enriched with aggregate.

4. The machine tool of claim 3 wherein the enriching aggregate is quartz, granite, or marble.

5. The machine tool of claim 3 wherein both of said means for holding comprise ground concrete and the enriching aggregate of one of the means for holding is different from the aggregate of the other means for holding.

* * * * *